United States Patent [19]
Haaf et al.

[11] Patent Number: 4,563,500
[45] Date of Patent: Jan. 7, 1986

[54] POLYPHENYLENE ETHER COMPOSITIONS WITH HIGH IMPACT STRENGTH AND IMPROVED MOLDABILITY

[75] Inventors: William R. Haaf, Voorhesville; Gim F. Lee, Jr., Albany, both of N.Y.

[73] Assignee: General Electric Company, Pittsfield, Mass.

[21] Appl. No.: 570,078

[22] Filed: Jan. 11, 1984

Related U.S. Application Data

[63] Continuation of Ser. No. 390,352, Jun. 21, 1982, abandoned, which is a continuation of Ser. No. 753,315, Dec. 22, 1976, abandoned.

[51] Int. Cl.$^4$ .......................... C08L 9/06; C08L 71/04
[52] U.S. Cl. .......................... 525/99; 525/93; 525/132; 525/905
[58] Field of Search .................. 525/99, 132, 92, 93, 525/905

[56] References Cited

U.S. PATENT DOCUMENTS

| | | | |
|---|---|---|---|
| 3,333,024 | 7/1967 | Haefele et al. | 525/314 |
| 3,465,063 | 9/1969 | Hassell et al. | 525/314 |
| 3,810,957 | 5/1974 | Lunk | 525/98 |
| 3,994,856 | 11/1976 | Katchman et al. | 524/492 |
| 4,113,800 | 9/1978 | Lee, Jr. | 525/89 |

*Primary Examiner*—Prince E. Willis
*Assistant Examiner*—Amelia B. Yarbrough
*Attorney, Agent, or Firm*—Hedman, Gibson, Costigan & Hoare

[57] ABSTRACT

There are provided thermoplastic compositions comprising a polyphenylene ether resin, a styrene resin and an impact modifying combination comprising (i) an elastomeric block copolymer of a vinyl aromatic compound and a conjugated diene and (ii) a hydrogenated derivative of (i). The compositions are moldable to articles having impact strength and mold flow properties unexpectedly superior to those expected in view of compositions prepared, respectively, with (c) (i) and (c) (ii) as the sole impact modifiers.

13 Claims, No Drawings

POLYPHENYLENE ETHER COMPOSITIONS WITH HIGH IMPACT STRENGTH AND IMPROVED MOLDABILITY

CROSS-REFERENCE TO RELATED APPLICATIONS

This is a continuation of Ser. No. 390,352, filed June 21, 1982, which in turn is a continuation of Ser. No. 753,315, filed Dec. 22, 1976, both now abandoned.

This invention relates to impact resistance polyphenylene ether resins having improved mold flow properties. More particularly, it pertains to compositions comprising a polyphenylene ether resin, a styrene resin and an impact improver combination (i) an A-B-A$^1$ type block copolymer and (ii) a hydrogenated derivative of (i). The compositions provide molded articles of good impact strength and superior flow in the mold.

BACKGROUND OF THE ART

The polyphenylene ether resins comprise a class of thermoplastic materials characterized by outstanding physical properties, a broad temperature use range and dimensional stability at elevated temperatures. They can be made by a variety of catalytic and non-catalytic processes from the corresponding phenols or reactive derivatives thereof. In general, they are prepared by the oxidative coupling of a phenolic compound with a complex copper catalyst. By way of illustration, descriptions of the preparation of polyphenylene ether resins are contained in Hay, U.S. Pat. Nos. 3,306,874 and 3,306,875 and in Stamatoff, U.S. Pat. Nos. 3,257,357 and 3,257,358, the disclosures of which are incorporated herein by reference.

In the Hay patents, polyphenylene ether resins are prepared by an oxidative coupling method comprising passing an oxygen-containing gas through a reaction solution of a phenol and a metal-amine complex catalyst. In the Stamatoff patents, polyphenylene ethers are prepared by reacting the corresponding phenolate ion with an initiator, e.g., an acid peroxide, in the presence of a complexing agent.

In Cizek, U.S. Pat. No. 3,383,435, incorporated herein by reference, it is disclosed that polyphenylene ethers and styrene resins are combinable in virtually all proportions to provide compositions having many properties improved over those of either of the components.

It has been proposed that compositions of polyphenylene ether resin and polystyrene can be modified by the inclusion of block copolymers of the vinyl aromatic compound, e.g., styrene, and a conjugated diene, e.g., butadiene. Such compositions, which have excellent impact resistance, are disclosed in U.S. Pat. No. 3,994,856. Compositions of a polyphenylene ether resin, a styrene resin and a block copolymer of an aromatic hydrocarbon such as styrene and a conjugated diene such as butadiene which has had its unsaturation reduced to less than 10% of its original value have also been proposed. These are disclosed in co-pending application Ser. No. 387,588, filed Aug. 13, 1973, now abandoned and assigned to the same assignee as herein.

It has not been discovered, quite unexpectedly, that using a combination of a block copolymer of the unsaturated type and a block copolymer of the saturated type will provide impact strengths better than using either one separately. This discovery permits important cost reductions in the hydrogenated block copolymer-based systems and improvement in melt flow in the unsaturated block copolymer systems, either one with improved impact properties. The new compositions can be modified with conventional thermoplastic additives, such as pigments, other flame-retardants, anti-oxidants, plasticizers, fillers, reinforcing glass fibers, and the like.

DESCRIPTION OF THE INVENTION

According to this invention, there are provided thermoplastic compositions useful for molding, e.g., injection molding, compression molding, transfer molding, and the like, which possess good impact resistance after molding, the composition comprising:

(a) a polyphenylene ether resin, (b) a styrene resin, and (c) an impact improver combination comprising (i) from 99 to 1 parts by weight of an elastomeric block copolymer of the A-B-A$^1$ type, wherein terminal blocks A and A$^1$ are the same or different and are polymerized vinyl aromatic hydrocarbons and center block B is a polymerized conjugated diene, the molecular weight of B being higher than the combined molecular weights of A and A$^1$, and (ii) from to 99 to 1 parts by weight of a hydrogenated derivative of component (i).

The polyphenylene ether resin is preferably one which is comprised of the formula:

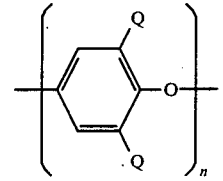

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

For purposes of the present invention, an especially preferred family of polyphenylene ethers include those having alkyl substitution in the two positions ortho to the oxygen ether atom, i.e., those of the formula wherein each Q is alkyl, most preferably having from 1 to 4 carbon atoms.

The most preferred polyphenylene ether resin for the purposes of this invention is poly(2,6-dimethyl-1,4-phenylene)ether.

In general, the polyphenylene ether resins of this invention can be prepared by following procedures fully described in the abovementioned patents of Hay and Stamatoff. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time, longer times providing a higher average number of repeating structural units. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime, sodium hydroxide, potassium hydroxide, and the like, or the product is separated from the catalyst by filtration, precipitation or other suitable means, as taught by Hay in U.S. Pat. No. 3,306,875.

After the product is precipitated and recovered, it may be redissolved and reprecipitated, as desired, to remove impuraties. Finally, it is filtered, washed and dried.

The styrene resins (b) are described in detail in Cizek, U.S. Pat. No. 3,383,435. In general, they will have at least 25% by weight of polymer units derived from a vinyl aromatic compound of the formula:

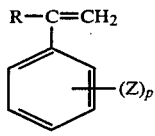

wherein R is hydrogen, (lower) alkyl or halogen, Z is vinyl, halogen or (lower) alkyl; and p is 0 or an integer of from 1 to the number of replaceable hydrogen atoms on the benzene nucleus. Herein, the term "(lower)alkyl" is intended to mean alkyl of from 1 to 6 carbon atoms.

Included among these are homopolymers such as polystyrene and monochloropolystyrene, as well as modified styrene resins, such as rubber-modified high-impact polystyrene, and the styrene containing copolymers such as the styrene-acrylonitrile copolymers (SAN), styrene-butadiene copolymers, styrene-acrylonitrile-α-alkyl styrene copolymers, styrene-acrylonitrile-butadiene copolymers (ABS), poly-α-methylstyrene, copolymers of ethylvinylbenzene and divinylbenzene, copolymers of styrene and maleic anhydride, and the like.

The elastomeric block copolymers (c) (i) and (c) (ii) are of the A-B-A$^1$ type in which the center and terminal block vary. In the compositions of this invention, the center block, B, is derived from a conjugated diene, e.g., butadiene, isoprene; 1,3-pentadiene, 2,3-dimethyl butadiene, or the like, and terminal blocks A and A$^1$ are derived from a vinyl aromatic compound, e.g., styrene, α-methyl styrene, vinyl toluene, vinyl naphthalene, or the like. In the most preferred compositions, the block copolymer will have terminal blocks A and A$^1$ comprised of polystyrene and center block B comprised of polybutadiene or polyisoprene.

The ratios of the comonomers can vary broadly, so long as the molecular weight of the center block is greater than the combined molecular weights of the terminal blocks. Preferably, within this limitation, the molecular weight of the terminal block will range from about 2,000 to about 150,000 and that of the center block will range from about 25,000 to about 1,000,000.

With respect to component (c) (i), such copolymers can be prepared by an organometallic initiation process using, for example, sodium or lithium metal or an organic derivative thereof. The diene monomers can be polymerized with a monofunctional or difunctional initiator, as is described in detail in "Polymer Chemistry of Synthetic Elastomers", edited by Kennedy et al, Interscience Publishers, Vol. 23, Part II (1969), pages 553–559, incorporated herein by reference.

Other methods of preparation are described in Zelinski, U.S. Pat. No. 3,251,905 and Holden et al, U.S. Pat. No. 3,231,635, the disclosures of which are incorporated herein by reference to save unnecessary detail.

With respect to component (c) (ii), these will be hydrogenated A-B-A$^1$ block copolymers, especially block copolymers, of the above type wherein the average unsaturation of the center block, B, has been reduced to less than 20% of its original value.

In the case of the hydrogenated block copolymers, it is preferred to form terminal blocks A and A$^1$ having an average molecular weight of from about 4,000 to about 115,000 and center block B with an average molecular weight of from about 20,000 to about 450,000.

The hydrogenated block copolymers usually confer better thermal stability and flow properties, e.g., melt viscosity, at elevated temperatures than the unhydrogenated block copolymers.

Hydrogenation may be conducted using a variety of hydrogenation catalysts, e.g., nickel, Raney nickel, copper chromate, molybdenum sulfide, finely divided platinum, etc., on a low surface area carrier. The hydrogenation can be carried out at any desired temperature or pressure, from atmospheric to 3,000 p.s.i.g., the usual range being between 100 and 1,000 p.s.i.g., at temperatures of from 75° to 600° F., for a period of time ranging from 0.1 to 24 hours, preferably 0.2 to 8 hours.

The preparation of the hydrogenated block copolymers is described in detail in Jones, U.S. Pat. No. 3,431,323.

As is taught in Cizek, the polyphenylene ethers and styrene resins are combinable in all proportions, e.g., from 1 to 99 parts of polyphenylene ether resin and from 99 to 1 parts of styrene resin. Similarly, the relative amount of A-B-A$^1$ block copolymers (e) (i) and (c) (ii) in the compositions of this invention can vary broadly. Preferred compositions will comprise from about 10 to about 90 parts by weight of polyphenylene ether resin (a), from about 90 to about 10 parts by weight of styrene resin (b) and from about 0.5 to about 20 parts by weight of A-B-A$^1$ block copolymer (c) (i) and from 0.5 to 20 parts by weight of hydrogenated A-B-A$^1$ block copolymer, based on 100 parts by weight of the resins component of the composition.

Other ingredients can also be included in the compositions of this invention, e.g., pigments, dyes, flame retardants, drip retardants, plasticizers, antioxidants, reinforcing agents, fillers and the like.

A reinforcing agent comprised of fibrous glass is preferred. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (one-eighth) inch.

In general, best properties will be obtained if the sized filamentous glass reinforcement comprises from at least 1 to about 80% by weight, based on 100 parts by weight of resin.

In applications where self-extinguishing compositions are required, flame retardant agents may be included. Illustrative flame retardant additives are disclosed in U.S. Pat. No. 3,833,685, U.S. Pat. No. 3,915,926 and U.S. Pat. No. 3,671,487, which are hereby incorporated by reference. Other flame retardants are disclosed in U.S. Pat. No. 3,681,281, and U.S. Pat. No. 3,557,053, U.S. Pat. No. 3,830,771 and U.K. No. 1,358,080, all of which are incorporated by reference.

In general, the preferred flame retardants are phosphorus compounds. These are selected from elemental phosphorus or organic phosphonic acids, phosphonates, phosphinates, phosphonites, phosphinites, phosphene oxides, phosphenes, phosphites or phosphates. Illustrative are triphenyl phosphine oxide. This can be used alone or mixed with hexabromobenzene or a chlorinated biphenyl and, optionally, antimony oxide.

Typical of the preferred phosphorus compounds to be employed in this invention would be those having the general formula:

in which X=S or O, and n=0 or 1, Y', Y" and Y'" are the same or different and represent alkyl, halocycloalkyl, halocycloalkyl aryl, alkyl substituted aryl, halogen substituted aryl, aryl substituted alkyl, alkyloxy, cycloalkyloxy, halogen substituted alkyloxy, aryloxy, halogen substituted aryloxy, or halogen. Two of the Y's may be combined into a cyclic structure, or one or two of the Y's may be difunctional in which case the compounds consists of short or long chain compounds containing a plurality of P atoms per molecule. Typical examples of suitable phosphorus compounds include: triphenyl phosphate, diphenyl phenyl phosphonate, phenyl diphenyl phosphinate, triphenyl phosphine, triphenyl phosphine oxide, tris(p-bromophenyl)phosphate, neopentyl phenyl phosphonate, tris(dibromopropyl)phosphate, dibenzyl phenyl phosphonate, poly(1,4 cyclo hexylene dimethylene)phenyl phosphonate, pentaerythritol bis(p bromophenyl)phosphonate, and the like. A preferred flame retardant is a tris(polyhalophenyl)phosphate, e.g., tris(tri-bromophenyl)phosphate.

Special mention is made of flame retardant additives consisting of aromatic carbonate homopolymers having repeating units of the formula:

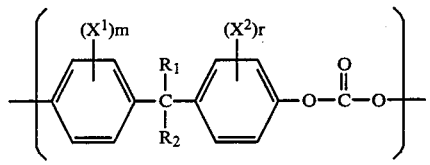

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, Procedure A.

The amount of flme retardant additive, if used, is not critical to the invention, so long as it is present in a minor proportion based on said composition—major proportions will detract from physical properties—but at least sufficient to render the polyphenylene ether-based resin fire resistant or self-extinguishing. Those skilled in the art are well aware that the amount will vary with the nature of the resin and with the efficiency of the additive. In general, however, the amount of additive will be from 0.5 to 40 parts by weight per 100 parts of resin.

The compositions of this invention can be prepared by blending the components to form a premix, passing the latter through an extruder at an elevated temperature, e.g., 425° to 640° F., cooling and chopping the extrudate into pellets, and molding them into the desired shape.

DESCRIPTION OF THE PREFERRED EMBODIMENTS

The following examples illustrate the compositions of the invention. They are set forth merely as a further illustration and are not to be construed as limiting the invention in any manner.

EXAMPLES 1–6

Compositions of poly(2,4-dimethyl-1,4-phenylene ether) resin, intrinsic viscosity about 0.48 deciliters/gram as measured in chloroform at 30° C., a styrene resin (Solar gp ("crystal" grade homopolystyrene, number average molecular weight about 62,000), the styrene-butadiene-styrene block copolymers (as shown in Table 1), tri-decyl phosphite, zinc sulfide, zinc oxide and titanium dioxide are prepared by extrusion at 575° F., chopped and molded in an injection molding machine.* The formulations and physical properties are summarized in Table 1.

*At 500° F. (Cylinder) and 198° F. (mold)

TABLE 1.

| | Compositions of poly(2,6-dimethyl-1,4-phenylene ether), homopolystyrene and styrene-butadiene-styrene block copolymer | | | | | |
|---|---|---|---|---|---|---|
| EXAMPLE | 1* | 2* | 3 | 4* | 5* | 6 |
| Ingredients (parts by weight) | | | | | | |
| poly(2,6-dimethyl-1,4-phenylene ether) | 30 | 30 | 30 | 30 | 30 | 30 |
| polystyrene | 50 | 50 | 50 | 40 | 40 | 40 |
| unhydrogenated styrene butadiene styrene block copolymer$^a$ | 20 | — | 10 | 30 | — | 15 |
| hydrogenated styrene-butadiene-styrene block copolymer$^b$ | — | 20 | 10 | — | 30 | 15 |
| tridecyl phosphite | 1.0 | 1.0 | 1.0 | 1.0 | 1.0 | 1.0 |
| zinc sulfide | 0.15 | 0.15 | 0.15 | 0.15 | 0.15 | 0.15 |
| zinc oxide | 0.15 | 0.15 | 0.15 | 0.15 | 0.15 | 0.15 |
| titanium dioxide | 3.0 | 3.0 | 3.0 | 3.0 | 3.0 | 3.0 |
| Properties | | | | | | |
| Tensile yield, psi | 7.7 | 8.0 | 7.4 | 6.4 | 5.9 | 5.7 |
| Tensile strength, psi | 6.6 | 6.6 | 6.5 | 6.4 | 5.8 | 5.6 |
| Tensile elongation, % | 50 | 20 | 29 | 55 | 33 | 36 |
| Izod impact, | 4.2 | 2.3 | 4.9 | 5.3 | 5.8 | 7.0 |

TABLE 1.-continued

| | Compositions of poly(2,6-dimethyl-1,4-phenylene ether), homopolystyrene and styrene-butadiene-styrene block copolymer | | | | | |
|---|---|---|---|---|---|---|
| EXAMPLE | 1* | 2* | 3 | 4* | 5* | 6 |
| ft. lbs./in. n. | | | | | | |
| Gardner impact, in. lbs. | | | | | | |
| 73° F. | 195 | 205 | 235 | 260 | 170 | 195 |
| −40° F. | 95 | 10 | 200 | 190 | 270 | 255 |
| Heat Distortion Temp., °F. | 239 | 243 | 241 | 241 | 237 | 242 |
| Flow channel length, in. | 19 | 29.75 | 25 | 13.5 | 27 | 21.5 |

*Control Experiment
<sup>a</sup>K 1101, Shell Chem. Co., Polymers Division
<sup>b</sup>Kraton G 6521, Shell Chem. Co., Polymers Division
*Control Experiment

EXAMPLES 7-9

Using the procedure described in Examples 1-6, blends of poly(2,6-dimethyl-1,4-phenylene ether) resin, intrinsic viscosity about 0.48 deciliters/gram as measured in chloroform at 30° C., a styrene resin (KPTL-5, ARCO Chemical Co., a "crystal" grade homopolystyrene, number average molecular weight 41,600), the styrene-butadiene-styrene block copolymers (as shown in Table 2), tridecyl phosphite, zinc sulfide and zinc oxide are prepared. The formulations and properties are summarized in Table 2.

TABLE 2.

| | Compositions of poly(2,6-dimethyl-1,4-phenylene ether) homopolystyrene and styrene-butadiene-styrene block copolymer | | |
|---|---|---|---|
| EXAMPLE | 7* | 8* | 9 |
| Ingredients (parts by weight) | | | |
| poly(2,6-dimethyl-1,4-phenylene ether) | 70 | 70 | 70 |
| polystyrene | 30 | 30 | 30 |
| unhydrogenated styrene-butadiene-styrene block copolymer<sup>a</sup> | 10 | — | 5 |
| hydrogenated styrene-butadiene-styrene block copolymer<sup>b</sup> | — | 10 | 5 |
| tridecyl phosphite | 0.5 | 0.5 | 0.5 |
| zinc sulfide | 0.15 | 0.15 | 0.15 |
| zinc oxide | 0.15 | 0.15 | 0.15 |
| Properties | | | |
| Tensile yield, psi | 12.4 | 10.5 | 11.5 |
| Tensile strength, psi | 10.5 | 8.8 | 9.4 |
| Tensile elongation, % | 67 | 52 | 68 |
| Izod impact, ft. lbs./in. n. | 0.9 | 2.7 | 2.1 |
| Gardner impact, in. lbs. 73° F. | 50 | 210 | 280 |
| Heat Distortion Temp., °F. | 292 | 299 | 290 |
| Flow channel length, in. | 16 | 25.75 | 20.25 |

*Control Experiments
<sup>a</sup> as in Examples 1-6
<sup>b</sup> as in Examples 1-6

As can be seen, the combination of impact modifiers permits less of the more expensive hydrogenated block copolymer to be used, and furthermore, the melt flow of the unhydrogenated block copolymer—containing compositions is improved to a degree greater than would be expected.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic composition comprising:
    (a) a polyphenylene ether resin;
    (b) a styrene resin; and
    (c) an Izod impact modifier comprising in combination (i) from 99 to 1 parts by weight of an elastomeric block copolymer of the A-B-A$^1$ type, wherein terminal blocks A and A$^1$ are the same or different and are polymerized vinyl aromatic hydrocarbons and center block B is a polymerized conjugated diene, the molecular weight of B being higher than the combined molecular weights of A and A$^1$, and (ii) from 1 to 99 parts by weight of a hydrogenated elastomeric A-B-A$^1$ block copolymer.

2. A composition as defined in claim 1 wherein the polyphenylene ether resin (a) is comprised of structural units of the formula:

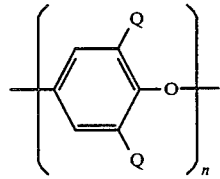

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

3. A composition as defined in claim 2 wherein each Q is alkyl having from 1 to 4 carbon atoms.

4. A composition as defined in claim 3 wherein said polyphenylene ether is poly(2,6-dimethyl-1,4-phenylene)ether.

5. A composition as defined in claim 1 wherein the styrene resin (b) is a homopolystyrene resin.

6. A composition as defined in claim 1 wherein the styrene resin (b) is a rubber modified high impact polystyrene resin.

7. A composition as defined in claim 1 wherein in A-B-A$^1$ block copolymer components (c) (i) and (c) (ii), each of terminal blocks A and A$^1$ has an average molecular weight of from about 2,000 to about 150,000 and center block B has an average molecular weight of from about 25,000 to about 1,000,000.

8. A composition as defined in claim 1 wherein component (c) (ii), there average of unsaturation of center block B has been reduced to less than 20% of its original value.

9. A composition as defined in claim 7 wherein in said A-B-A$^1$ block copolymer components (c) (i) and (c) (ii), each of terminal blocks A and A$^1$ has an average molecular weight of from about 4,000 to about 115,000 and center block B has an average molecular weight of from about 20,000 to about 450,000.

10. A composition as defined in claim 1 wherein in the A-B-A$^1$ block copolymer component (c) (i), the vinyl aromatic hydrocarbon of terminal blocks A and A$^1$ are selected from the group consisting of styrene, α-methyl styrene, vinyl toluene, vinyl xylene and vinyl naphthalene and the conjugated diene of center block B is selected from the group consisting of butadiene, isoprene, 1,3-pentadiene and 2,3-dimethylbutadiene.

11. A composition as defined in claim 1, which comprises from about 10 to about 90 parts by weight of polyphenylene ether resin (a), from about 90 to about 10 parts by weight of styrene resin (b), from about 0.5 to about 20 parts by weight of A-B-A$^1$ block copolymer (c)(i) and from about 0.5 to about 20 parts by weight of hydrogenated A-B-A$^1$ block copolymer (c)(ii).

12. A composition as defined in claim 1 which includes a reinforcing amount of a reinforcing agent.

13. A composition as defined in claim 1 which includes a flame retardant amount of a flame retardant agent.

* * * * *